US010442291B2

(12) United States Patent
Isono et al.

(10) Patent No.: US 10,442,291 B2
(45) Date of Patent: Oct. 15, 2019

(54) DRIVE UNIT

(71) Applicants: TOYOTA JIDOSHA KABUSHIKI KAISHA, Toyota-shi, Aichi (JP); ALCHEMICA CORPORATION, Susono-shi, Shizuoka (JP)

(72) Inventors: Hiroshi Isono, Susono (JP); Nobuyoshi Sugitani, Susono (JP); Aizoh Kubo, Kyoto (JP)

(73) Assignees: TOYOTA JIDOSHA KABUSHIKI KAISHA, Toyota (JP); ALCHEMICA CORPORATION, Susono-Shi (JP)

( * ) Notice: Subject to any disclaimer, the term of this patent is extended or adjusted under 35 U.S.C. 154(b) by 2 days.

(21) Appl. No.: 15/581,720

(22) Filed: Apr. 28, 2017

(65) Prior Publication Data
US 2017/0313182 A1 Nov. 2, 2017

(30) Foreign Application Priority Data
Apr. 28, 2016 (JP) .................................. 2016-091684

(51) Int. Cl.
*B60K 17/04* (2006.01)
*B60K 1/02* (2006.01)
(Continued)

(52) U.S. Cl.
CPC .............. *B60K 17/046* (2013.01); *B60K 1/00* (2013.01); *B60K 1/02* (2013.01); *B60K 23/04* (2013.01);
(Continued)

(58) Field of Classification Search
CPC .... B60K 17/046; B60K 1/02; B60K 23/0808; F16D 55/2262; F16D 65/18; F16D 65/186; F16D 2121/20
See application file for complete search history.

(56) References Cited

U.S. PATENT DOCUMENTS

| 5,419,406 A * | 5/1995 | Kawamoto | ............. B60K 1/02 |
| | | | 180/65.6 |
| 5,931,757 A * | 8/1999 | Schmidt | ................... B60K 6/26 |
| | | | 475/2 |

(Continued)

FOREIGN PATENT DOCUMENTS

| CN | 102112333 A | 6/2011 |
| JP | H05-169991 A | 7/1993 |

(Continued)

*Primary Examiner* — Jacob S. Scott
*Assistant Examiner* — Tinh T Dang
(74) *Attorney, Agent, or Firm* — Oliff PLC (57) ABSTRACT

A drive unit a drive unit which can prevent an occurrence of an unintentional relative rotation between the right and the left wheels is provided. The drive unit comprises: a first motor connected to the first driveshaft and a second motor connected to the second drive shaft; a first torque transmitting route between the first motor and the first drive shaft; a second torque transmitting route between the second motor and the second drive shaft; a first rotary member arranged in the first torque transmitting route; a second rotary member arranged in the second torque transmitting route; and a restriction device that restricts a differential rotation between the first rotary member and the second rotary member.

10 Claims, 3 Drawing Sheets

(51) Int. Cl.
    *B60K 23/04*     (2006.01)
    *F16D 55/226*    (2006.01)
    *F16D 65/18*     (2006.01)
    *F16H 1/28*      (2006.01)
    *F16H 48/36*     (2012.01)
    *B60K 1/00*      (2006.01)
    *F16D 121/20*    (2012.01)

(52) U.S. Cl.
    CPC ......... *F16D 55/2262* (2013.01); *F16D 65/18* (2013.01); *F16D 65/186* (2013.01); *F16H 1/28* (2013.01); *F16H 48/36* (2013.01); *B60K 2023/043* (2013.01); *F16D 2121/20* (2013.01)

(56) References Cited

U.S. PATENT DOCUMENTS

| | | | | |
|---|---|---|---|---|
| 7,938,208 | B2* | 5/2011 | Oba | B60K 6/365 |
| | | | | 180/65.225 |
| 8,678,118 | B2* | 3/2014 | Takenaka | B60K 1/02 |
| | | | | 180/65.1 |
| 9,221,334 | B2* | 12/2015 | Knoblauch | B60K 1/02 |
| 2010/0018789 | A1* | 1/2010 | Oba | B60K 6/365 |
| | | | | 180/65.235 |
| 2011/0139522 | A1 | 6/2011 | Takenaka et al. | |
| 2012/0143426 | A1* | 6/2012 | Yamamoto | B60K 6/448 |
| | | | | 701/22 |
| 2013/0059694 | A1* | 3/2013 | Ooiso | B60K 1/02 |
| | | | | 475/269 |
| 2016/0153537 | A1 | 6/2016 | Kubo et al. | |
| 2017/0182884 | A1* | 6/2017 | Jeong | B60L 15/2054 |
| 2017/0241532 | A1* | 8/2017 | Isono | F16H 48/10 |
| 2018/0298994 | A1* | 10/2018 | Lian | B60K 1/02 |

FOREIGN PATENT DOCUMENTS

| | | |
|---|---|---|
| JP | H11-243664 A | 9/1999 |
| JP | 2002-112410 A | 4/2002 |
| JP | 2010-048379 A | 3/2010 |
| WO | 2015008661 A1 | 1/2015 |

* cited by examiner

DRIVE UNIT

CROSS REFERENCE TO RELATED APPLICATION

The present invention claims the benefit of Japanese Patent Application No. 2016-091684 filed on Apr. 28, 2016 with the Japanese Patent Office, the disclosures of which are incorporated herein by reference in its entirety.

BACKGROUND

Field of the Invention

Embodiments of the present application relate to the art of a drive unit for differentiating torques of drive shafts connected to right and left drive wheels.

Discussion of the Related Art

PCT international publication WO 2015/008661 describes one example of a torque vectoring device of this kind. The drive gear unit taught by WO 2015/008661 as a torque vectoring device comprises a differential unit for distributing torque delivered from a drive motor to right and left drive wheels, and a differential motor for controlling a torque split ratio to the drive wheels. The differential unit is comprised of a pair of single-pinion planetary gear units. In the differential unit, sun gears are rotated by a torque of the drive motor, ring gears are connected to each other in such a manner as to rotate in opposite directions, and the carriers are connected to drive wheels through driveshafts.

In a vehicle provided with the torque vectoring device taught by WO 2015/008661, the rotary members are arranged parallel to each other so that a power loss may be reduced while allowing the carriers to smoothly rotate relatively to each other. That is, in a vehicle having the torque vectoring device taught by WO 2015/008661, a relative rotation between the right wheel and the left wheel are caused easily by a difference in a friction coefficient and unevenness of the road. However, if the relative rotation between the right and the left wheels is caused too easily, a straight line stability may be worsened. In order to prevent such unintentional relative rotation between the right and the left wheels, a complicated control is required to control a differential motor. In addition, an output torque of the differential motor may be varied to cause vibrations.

SUMMARY

Aspects of embodiments of the present application have been conceived noting the foregoing technical problems, and it is therefore an object of embodiments of the present application is to provide a drive unit which can prevent an occurrence of an unintentional relative rotation between the right and the left wheels.

The present application relates to a drive unit, comprising: a prime mover that propels a vehicle; a first driveshaft that transmits torque from the prime mover to one of right and left driving wheels; and a second drive shaft that transmits torque from the prime mover to other of the right and left driving wheels. The first drive shaft and the second drive shaft are allowed to be rotated by different torques. The prime mover includes a first motor connected to the first driveshaft in a torque transmittable manner, and a second motor connected to the second drive shaft in a torque transmittable manner. In order to achieve the above-explained objective, according to the embodiments of the present disclosure, the drive unit is provided with: a first torque transmitting route for transmitting torque from the first motor to the first drive shaft; a second torque transmitting route for transmitting torque from the second motor to the second drive shaft; a first rotary member that is arranged in the first torque transmitting route; a second rotary member that is arranged in the second torque transmitting route; and a restriction device that is interposed between the first rotary member and the second rotary member to restrict a differential rotation between the first rotary member and the second rotary member by changing a torque transmitted between the first rotary member and the second rotary member.

In a non-limiting embodiment, the drive unit may further comprise: a third rotary member arranged in the first torque transmitting route; a fourth rotary member arranged in the second torque transmitting route; and a lock device that stops rotation of any one of the third rotary member and the fourth rotary member.

In a non-limiting embodiment, the restriction device may include a frictional engagement mechanism having a first rotary element rotated integrally with the first rotary member, a second rotary element rotated integrally with the second rotary member, and an actuator that selectively brings the second rotary element into contact to the first rotary element while controlling a contact pressure therebetween. The first rotary element may include a first brake rotor, and the second rotary element may include a second brake rotor. In addition, the drive unit may further comprise: a first brake device that brings a first fixing member into contact to the first brake rotor to apply a braking torque to the first rotary element; and a second braking device that brings a second fixing member into contact to the second brake rotor to apply a braking torque to the second rotary element.

In a non-limiting embodiment, a rotational center axis of the first motor and a rotational center axis of the second motor may be aligned coaxially with each other. The first rotary member may include a first output shaft extending toward the second motor, and a first output gear may be fitted onto a portion of the first output shaft extending toward the second motor. A first gear train may be formed of the first output gear and gears connected to the first driveshaft in such a manner as to rotate around axes parallel to the rotational center axis of the first output shaft, and the first torque transmitting route may include the first output shaft, the first output gear and the first gear train. Likewise, the second rotary member may include a second output shaft extending toward the first motor, and a second output gear may be fitted onto a portion of the second output shaft extending toward the first motor. A second gear train may also be formed of the second output gear and gears connected to the second driveshaft in such a manner as to rotate around axes parallel to the rotational center axis of the second output shaft, and the second torque transmitting route may include the second output shaft, the second output gear and the second gear train. In addition, the restriction device may be interposed between laterally inner ends of the first output shaft and the second output shaft to restrict a differential rotation between the first output shaft and the second output shaft by changing a torque transmitted between the first output shaft and the second output shaft.

In a non-limiting embodiment, the rotational center axis of the first motor and the rotational center axis of the second motor may be aligned coaxially with each other. In addition, the first driveshaft may be connected to the first torque transmitting route in such a manner that the rotational center axis of an end portion thereof is aligned coaxially with the rotational center axis of the first motor, and the second driveshaft may be connected to the second torque transmitting route in such a manner that the rotational center axis of an end portion thereof is aligned coaxially with the rotational center axis of the second motor.

In a non-limiting embodiment, the first output shaft of the first motor may protrude from both sides of the first motor, and a first planetary gear unit comprising at least three rotary elements may be connected to a portion of the first output shaft protruding from the first motor in a direction opposite to the second motor. The first driveshaft may be connected to one of the rotary elements of the first planetary gear unit, and the first torque transmitting route may include the first output shaft and the first planetary gear unit. Likewise, the second output shaft of the second motor may protrude from both sides of the second motor, and a second planetary gear unit comprising at least three rotary elements may be connected to a portion of the second output shaft protruding from the second motor in a direction opposite to the first motor. The second driveshaft may also be connected to one of the rotary elements of the second planetary gear unit, and the second torque transmitting route may include the second output shaft and the second planetary gear unit. In addition, the restriction device may be interposed between the portion of the first output shaft protruding from the first motor in a direction opposite to the second motor and the portion of the second output shaft protruding from the second motor in a direction opposite to the first motor, to restrict a differential rotation between the first output shaft and the second output shaft by changing a torque transmitted between the first output shaft and the second output shaft.

Thus, according to the embodiment of the present disclosure, the drive unit is provided with the restriction device that changed a torque transmitted between the first rotary member of the first torque transmitting route and the second rotary member of the second torque transmitting route. According to the embodiment of the present disclosure, therefore, the first output shaft and the second output shaft are allowed to be rotated integrally by the restriction device even if the output torques of the first motor and the second motor are different. For this reason, a relative rotation between the first driveshaft and the second driveshaft can be prevented during propulsion in a straight line or making a slight turn to improve running stability of the vehicle without requiring accurate control.

As described, the drive unit further comprises the lock device for selectively stopping rotation of any one of the rotary members of the first torque transmitting route and the second torque transmitting route. According to the embodiment of the present disclosure, therefore, both of the driveshafts may be halted by only one lock device by engaging the restriction device while halting one of the output shafts by the lock device.

As also described, the first rotary element of the restriction device includes the first brake rotor, and the second rotary element of the restriction device includes the second brake rotor. That is, the restriction device shares the first rotary element with the first brake device, and the second rotary element with the second brake device. According to the embodiment of the present disclosure, therefore, number of parts may be reduced to save a manufacturing cost and to downsize the drive unit.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
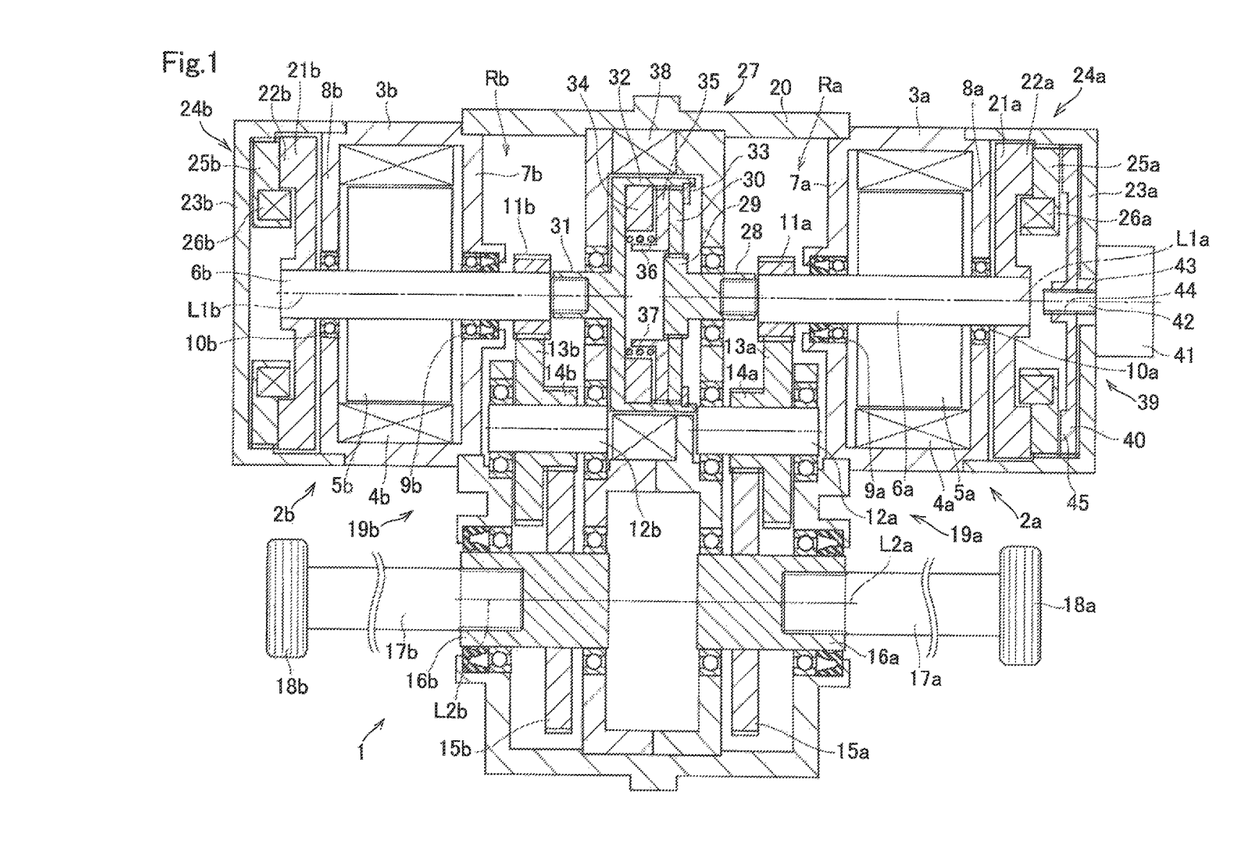
FIG. 1 is a cross-sectional view showing a structure of the drive unit according to a first embodiment of the present disclosure.

The preferred embodiments of the present application will now be explained with reference to the accompanying drawings. Turning now to FIG. 1, there is shown the first embodiment of the drive unit according to the present disclosure. As can be seen from FIG. 1, a structure of the drive unit 1 is substantially symmetrical across a width center of the vehicle. In FIG. 1, accordingly, the reference letter "a" designates members arranged in the right half of the drive unit 1, and the reference letters "b" designates members arranged in the left half of the drive unit 1. In the flowing explanation, the members in the right half of the drive unit 1 will be called the "first member", and the members in the left half of the drive unit 1 will be called the "second member" as necessary.

The drive unit 1 includes a motor 2 serving as a prime mover of a vehicle. For example, a permanent magnet synchronous motor may be used as the drive motor 2. The drive motor 2 comprises a cylindrical stator 4 fixed to an inner surface of a motor housing 3, and a cylindrical rotor 8 situated in an inner circumferential side of the stator 4. The rotor 5 is fitted onto an output shaft 6 to be rotated integrally therewith around a rotational center axis L1. Both ends of the output shaft 6 penetrate through sidewalls 7 and 8 while being supported by bearings 9 and 10 in a rotatable manner.

An output gear 11 is fitted onto a laterally inner end of the output shaft 6 protruding from a sidewall 7, and a countershaft 12 extends parallel to the output shaft 6. A counter driven gear 13 that is diametrically larger than the output gear 11 is fitted onto a laterally outer portion of the countershaft 12 while being meshed with the output gear 11, and a pinion gear 14 that is diametrically smaller than the counter driven gear 13 is also fitted onto a laterally inner portion of the countershaft 12 to be meshed with a final reduction gear 15 that is diametrically larger than the pinion gear 14.

A cylindrical shaft 16 is inserted into the final reduction gear 15 in such a manner as to protrude laterally outwardly while opening to laterally outside. Specifically, the cylindrical shaft 16 extends in such a manner that a rotational center axis L2 thereof extends in parallel with the rotational center axis L1 of the output shaft 6. A laterally inner end of a driveshaft 17 is splined into the opening of the cylindrical shaft 16, and a drive wheel 18 is attached to a laterally outer end of the driveshaft 17. As the conventional driveshaft, the driveshaft 17 is provided with a connecting device (not shown) such as a constant-velocity joint for adjusting a level of the rotational center.

Accordingly, torque of the output gear 11 is delivered to the driveshaft 17 while being multiplied in accordance with a gear ratio between the output gear 11 and the counter driven gear 13, and a gear ratio between the pinion gear 14 and the final reduction gear 15. That is, a geartrain including the output gear 11, the counter driven gear 13, the pinion gear 14 and the final reduction gear 15 serves as a speed reducing device 19. In addition, the output shaft 6, the output gear 11, the counter driven gear 13, the countershaft 12, the pinion gear 14, and the final reduction gear 15 form a torque transmitting route R.

The output gear 11, the counter driven gear 13, the pinion gear 14, the final reduction gear 15, the countershaft 12 and the cylindrical shaft 16 are held in a center housing 20. A right end of the center housing 20 is joined to the first motor housing 3a, and a left end of the center housing 20 is joined to the second motor housing 3b. That is, the countershaft 12 and the cylindrical shaft 16 are supported by the center housing 20 in a rotatable manner.

Specifically, in the center housing 20, the first output shaft 6a and the second output shaft 6b are held in such a manner that the rotational center axis L1a of the first output shaft 6a and the rotational center axis L1b of the second output shaft 6b are aligned coaxially with each other. Likewise, the rotational center axis L2a of the first cylindrical shaft 16a and the rotational center axis L2b of the second cylindrical shaft 16b are aligned coaxially with each other.

A disc-shaped brake rotor 21 made of magnetic material is fitted onto a laterally outer end of the output shaft 6. An outer diameter of the brake rotor 21 is slightly smaller than an inner diameter of the motor housing 3, and an annular protrusion 22 is formed on a face opposite to the motor 2.

A cylindrically-bottomed cover member 23 having an inner diameter larger than the outer diameter of the brake rotor 21 is joined to a laterally outer end of the motor housing 3. A brake device 24 is held in a space enclosed by the motor housing 3 and the cover member 23.

The brake device 24 comprises the brake rotor 21, and an annular pushing member 25 that is opposed to the annular protrusion 22 of the brake rotor 21. An outer circumferential face of the pushing member 25 is splined to an inner circumferential face of the cover member 23 so that the pushing member 25 is allowed to reciprocate in an axial direction of the cover member 23 but is not allowed to rotate. An inner circumferential portion of the pushing member 25 is situated in an inner circumferential side of the annular protrusion 22 while being protruded toward the brake rotor 21, and a coil 26 is wound around the protrusion of the pushing member 25.

When the coil 26 is energized, the coil 26 generates an electromagnetic force so that the pushing member 25 is brought into contact to the brake rotor 21 by the electromagnetic force. In this situation, since the pushing member 25 is not allowed to rotate, a frictional braking torque is applied to the brake rotor 21 according to a contact pressure between the pushing member 25 and the brake rotor 21. Consequently, the braking torque is applied to the output shaft 6 of the motor 2. The frictional force acting between the brake rotor 21 and the pushing member 25 is changed depending on a current value applied to the coil 26, that is, the braking torque applied to the brake rotor 21 can be controlled by controlling the current value applied to the coil 26.

Next, an action of the drive unit 1 will be explained hereinafter. The motor 2 also has a generating function, and is adapted to generate not only a driving torque but also a braking torque. Specifically, the first motor 2a is connected to the first driveshaft 17a, and the second motor 2b is connected to the second driveshaft 17b. That is, the first motor 2a and the second motor 2b are connected independently to the first driveshaft 17a and the second driveshaft 17b. In the drive unit 1, therefore, torques delivered to the first driveshaft 17a and the second driveshaft 17b can be differentiated from each other to rotate the first drive wheel 18a and the second drive wheel 18b relatively to each other, by adjusting output torques of the first motor 2a and the second motor 2b in accordance with required driving forces or braking forces (as will be simply called the "driving force" hereinafter) of the first drive wheel 18a and the second drive wheel 18b. Thus, the drive unit 1 is adapted to perform a differential action. Specifically, the driving forces of the first drive wheel 18a and the second drive wheel 18b may be equalized by equalizing the output torques of the first motor 2a and the second motor 2b. By contrast, the driving forces of the first drive wheel 18a and the second drive wheel 18b may also be differentiated by differentiating the output torques of the first motor 2a and the second motor 2b to stabilize vehicle behavior during turning.

When a required braking force is larger than the maximum braking torque of the motor 2 or when a state of charge of a battery (not shown) connected to the motor 2 is full, a shortage of the braking force is generated by the brake device 24 by supplying current to the coil 26 in accordance with the shortage of the braking torque. The torques generated by the first brake device 24a and the second brake device 24b may also be differentiated in accordance with the required braking force to be applied to the first drive wheel 18a and the second drive wheel 18b.

The driving torques or the braking torques generated by the motor 2 and the brake device 24 are delivered to the drive wheel 18 through the speed reducing device 19 while being amplified. For this reason, the maximum driving torque and the braking torque required for the motor 2 and the brake device 24 may be reduced, and hence the motor 2 and the brake device 24 may be downsized.

In addition, since the brake device 24 is situated in an input side (i.e., the prime mover side) of the driveshaft 17, number of parts attached to the drive wheel 18 may be reduced. In the drive unit 1, therefore, an unsprung load of the vehicle may be reduced to reduce vibrations and to improve running stability of the vehicle.

Further, as described, the output shaft 6 of the motor 2 and the driveshaft 17 are arranged in such a manner that the rotational center axis L1 of the output shaft 6 and the rotational center axis L2 of the cylindrical shaft 16 are aligned parallel to each other. In the drive unit 1, therefore, the first final reduction gear 15a and the second final reduction gear 15b may be arranged close to each other, and the first cylindrical shaft 16a and the second cylindrical shaft 16b may be arranged close to each other. For this reason, each of the driveshaft 17 may be elongated so that an oscillation angle of the connecting device (not shown) of the driveshaft 17 may be reduced to reduce a power loss.

When the vehicle is travelling in a straight line or making a slight turn, it is preferable to equalize rotational speeds of the first drive wheel 18a and the second drive wheel 18b by equalizing the torques applied thereto. To this end, an accurate control of the output torques of the first motor 2a and the second motor 2b is required. Instead, according to the embodiment of the present application, the drive unit 1 is provided with a restriction device 27 to selectively rotate the first output shaft 6a of the first motor 2a and the second output shaft 6b of the second motor 2b integrally. In the first embodiment, accordingly, the first output shaft 6a serves as a first rotary member, and the second output shaft 6b serves as a second rotary member.

The restriction device 27 is adapted to enable torque transmission between any of rotary members in the first torque transmitting route Ra and any of rotary members in the second torque transmitting route Rb while restricting a differential rotation between those rotary members. Specifically, in the drive unit 1 shown in FIG. 1, a frictional engagement mechanism is used as the restriction device 27 to rotate the first output shaft 6a of the first motor 2a and the second output shaft 6b of the second motor 2b integrally. An action of the restriction device 27 will be explained hereinafter.

A leading end of the first output shaft 6a of the first motor 2a protrudes from the first output gear 11a toward the width center of the drive unit 1 to be connected to a connection shaft 28. Specifically, a hollow portion to which the leading end of the first output shaft 6a is inserted is formed on a leading end of the connection shaft 28, and a flange 29 is formed on a base end of the connection shaft 28. A spline is formed on an outer circumferential face of the flange 29 so that an annular connection plate 30 is splined onto the flange 29. The flange 29 may also be formed integrally with the connection plate 30. In the drive unit 1, accordingly, the connection shaft 28 and the connection plate 30 serve as a first rotary element.

A leading end of the second output shaft 6b of the second motor 2b also protrudes from the second output gear 11b toward the width center of the drive unit 1 to be connected to an extension shaft 31. Specifically, a hollow portion is formed on a leading end of the extension shaft 31, and the leading end of the second output shaft 6b is inserted into the hollow portion. On the other hand, a bottomed-cylindrical holder portion 32 is formed on a base end of the extension shaft 31, and the connection plate 30 is held in the holder portion 32 while being allowed to rotate relatively therewith. In order to prevent detachment of the connection plate 30 from the holder portion 32, a snap ring 33 is attached to an opening end of the holder portion 32.

In the holder portion 32, an annular positioning plate 34 is disposed adjacent to a bottom wall, and a pushing plate 35 is interposed between the positioning plate 34 and the connection plate 30. The pushing plate 35 is splined to the holder portion 32 so that the pushing plate 35 is allowed to rotate integrally with the holder portion 32 and to reciprocate in the axial direction within the holder portion 32. The pushing plate 35 is made of magnetic material, and a cylindrical portion 36 protrudes from an inner circumferential end of the pushing plate 35 toward the bottom wall of the holder portion 32. A coil spring 37 is fitted onto the cylindrical portion 36 while being compressed by the pushing plate 35 and the bottom wall of the holder portion 32. A coil 38 is wound around the holder portion 32. In the drive unit 1, accordingly, the extension shaft 31, the holder portion 32 and the pushing plate 35 serve as a second rotary element, and the coil 38 serves as an actuator.

When the coil 38 is energized, an electromagnetic force is applied to the pushing plate 35 to push the pushing plate 35 toward the bottom wall of the holder portion 32 against the elastic force of the coil spring 37. By contrast, when a current supply to the coil 38 is stopped, the pushing plate 35 is pushed by the coil spring 37 to be brought into frictional contact to the connection plate 30. The friction force to be established between the pushing plate 35 and the connection plate 30 is adjusted in such a manner that a relative rotation between the pushing plate 35 and the connection plate 30 will not be caused by a speed difference or a torque difference between the first output shaft 6a and the second output shaft 6b during propulsion in a straight line or making a slight turn. In the restriction device 27, specifically, a torque transmitting capacity between the pushing plate 35 and the connection plate 30 is governed by a current value applied to the coil 38, and a torque transmission between the pushing plate 35 and the connection plate 30 is interrupted by stopping a current supply to the coil 38. That is, the restriction device 27 is adapted to increase torque transmitted between the first output shaft 6a and the second output shaft 6b from zero.

Specifically, when the vehicle is travelling in a straight line or making a slight turn, the current supply to the coil 38 is stopped to bring the pushing plate 35 into frictional contact to the connection plate 30. Consequently, the first output shaft 6a and the second output shaft 6b are rotated integrally even if the output torques of the first motor 2a and the second motor 2b are different. For this reason, a relative rotation between the first drive wheel 18a and the second drive wheel 18b can be prevented during propulsion in a straight line or making a slight turn to improve running stability of the vehicle without requiring accurate control.

However, the braking torque applied to the first drive wheel 18a and the second drive wheel 18b cannot be maintained when the power is off to park the vehicle. In order to maintain a frictional contact between the brake rotor 21 and the first pushing member 25a thereby halting the drive wheels 18a and 18b even when the power is off, the drive unit 1 is provided with a parking lock device 39. Specifically, the parking lock device 39 comprises an annular plate member 40 opposed to the first brake rotor 21a across the first pushing member 25a, and a parking motor 41 that reciprocates the plate member 40 in the axial direction.

The parking motor 41 is attached to an outer face a sidewall of the first cover member 23a, and an output shaft 42 of the parking motor 41 penetrates through the sidewall of the first cover member 23a and the plate member 40. A male thread 43 is formed on an outer circumferential face of the output shaft 42 of the parking motor 41, and a female thread 44 is formed on an inner circumferential face of the plate member 40 to be mated with the male thread 43. An outer circumferential edge of the plate member 40 is also splined to the inner circumferential face of the first cover member 23a so that the plate member 40 is allowed to reciprocate on the output shaft 42 by actuating the parking motor 41. Thus, the output shaft 42 and the plate member 40 serve as a feed screw mechanism. In addition, an annular protrusion 45 protruding toward the first pushing member 25a is formed on an outer circumferential portion of the plate member 40 to be contacted to the first pushing member 25a.

In order to maintain the braking torque when the vehicle is powered off or when a shift lever is shifted to the parking position, the plate member 40 is brought into contact to the first pushing member 25a to clamp the first pushing member 25a between the plate member 40 and the first brake rotor 21a by activating the parking motor 41, and then the current supply to the parking motor 41 is stopped. Consequently, the braking torque is maintained by the first brake device 24a to stop the rotation of the first output shaft 6a Thus, when the vehicle is parked, the current supply to the coil 26 is stopped and hence the restriction device 27 is brought into engagement. In this situation, therefore, rotation of the second output shaft 6b is also stopped by stopping the rotation of the first output shaft 6a by the parking lock device 39. In other words, the braking torques applied to the first drive wheel 18a and the second drive wheel 18b can be maintained. Instead, the parking lock device 39 may also be arranged in such a manner as to stop the rotation of the second output shaft 6b or the countershaft 12.

Figure 2:
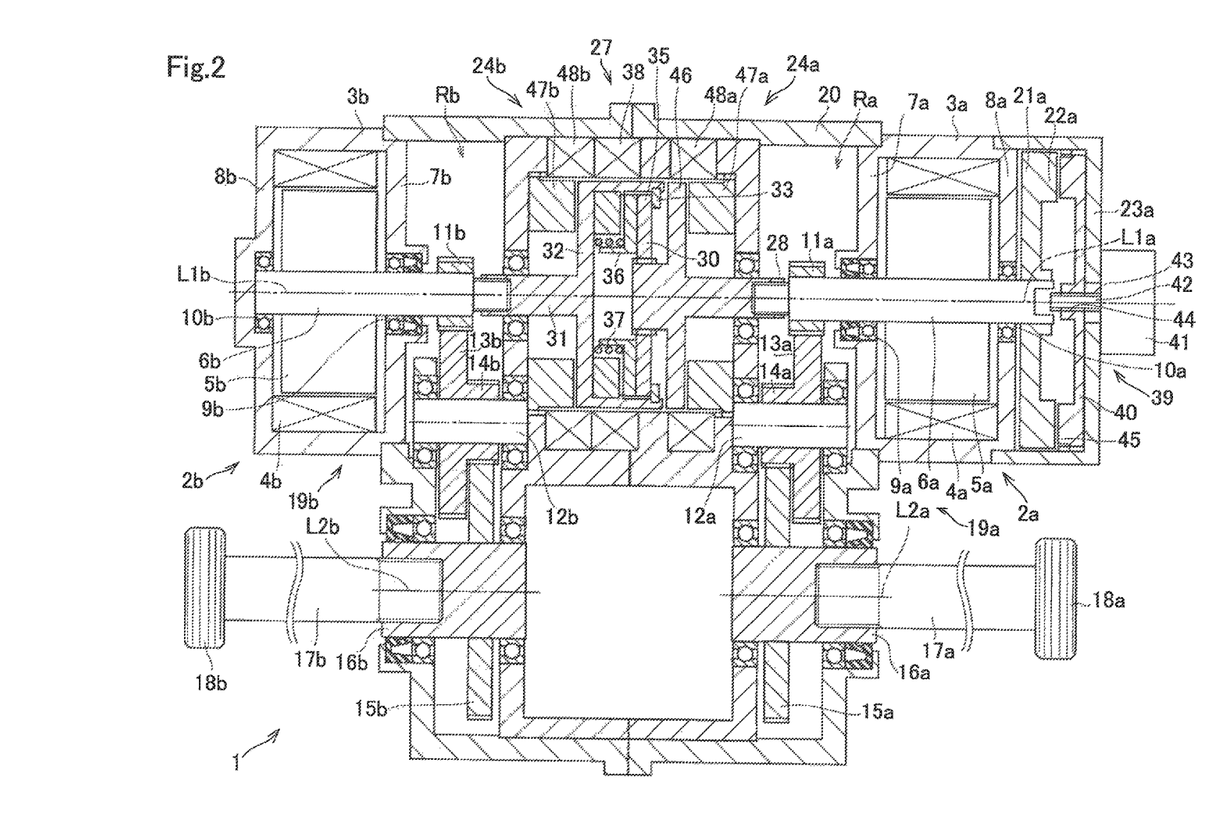
FIG. 2 is a cross-sectional view showing a structure of the drive unit according to a second embodiment of the present disclosure.

Turning to FIG. 2, there is shown the second embodiment in which the brake device 24 is arranged in the width center of the drive unit 1. In the following explanation, common reference numerals are allotted to the elements in common with those in the first embodiment, and detailed explanation for those common elements will be omitted.

In the drive unit 1 shown in FIG. 2, a spline is formed on an outer circumferential face of the base end of the connection shaft 28, and the connection plate 30 is splined onto the base end of the connection shaft 28. In addition, a flange 46 serving as a first brake rotor is formed on an intermediate portion of the connection shaft 28. Specifically, the flange 46 is formed on the connection shaft 28 at a portion between an opening end of the holder portion 32 and a leading end of the connection shaft 28, and an outer diameter of the flange 46 is substantially identical to that of the holder portion 32.

An outer circumferential face of a first brake disc 47a made of magnetic material is splined to an inner circumferential face of the center housing 20 while being opposed to the first brake disc 47a. That is, the first brake disc 47a is allowed to reciprocate in the axial direction but is not allowed to rotate. In order to apply an electromagnetic force to the first brake disc 47a, a first coil 48a is wound around the flange 46 and the first brake disc 47a. In the drive unit 1 shown in FIG. 2, accordingly, the first brake disc 47a is brought into frictional contact to the flange 46 by applying current to the first coil 48a. That is, a frictional force to be established between the first brake disc 47a and the flange 46 is governed by a current value applied to the first coil 48a. Optionally, a return spring or the like may be arranged in the drive unit shown in FIG. 3 to isolate the first brake disc 47a away from the flange 46.

An outer circumferential face of a second brake disc 47b made of magnetic material is also splined to the inner circumferential face of the center housing 20 while being opposed to the bottom wall of the holder portion 32 from the second motor 2b side. That is, the second brake disc 47b is allowed to reciprocate in the axial direction but is not allowed to rotate. In order to apply an electromagnetic force to the second brake disc 47b, a second coil 48b is wound around the second brake disc 47b. In the drive unit 1 shown in FIG. 2, accordingly, the second brake disc 47b is brought into frictional contact to the bottom wall of the holder portion 32 by applying current to the second coil 48b. That is, a braking torque is applied to the bottom wall of the holder portion 32 in accordance with the current applied to the second coil 48b. Thus, the holder portion 32 serves as a second brake rotor in the drive unit 1 shown in FIG. 2. Optionally, a return spring or the like may also be arranged in the drive unit 1 shown in FIG. 2 to isolate the second brake disc 47b away from the bottom wall of the holder portion 32.

Thus, in the drive unit 1 shown in FIG. 2, the plate member 40 is opposed directly to the brake rotor 21 to be contacted to stop the rotation of the first output shaft 6a.

According to the second embodiment, therefore, the first coil 48a and the second coil 48b as the actuators of the brake device 24 can be arranged on both sides of the coil 38 for controlling the restriction device 27. For this reason, an electric circuit for supplying the current to the first coil 48a, the coil 38 and the second coil 48b may be simplified.

In addition, since the flange 46 serving as a brake rotor of the brake device 24 is formed on the connection shaft 28 and the connection plate 30 serving as an engagement element is splined onto the connection shaft 28, the brake device 24 and the restriction device 27 are allowed to share the parts to reduce number of parts. For this reason, the drive unit 1 may be downsized and a manufacturing cost thereof may be reduced.

Figure 3:
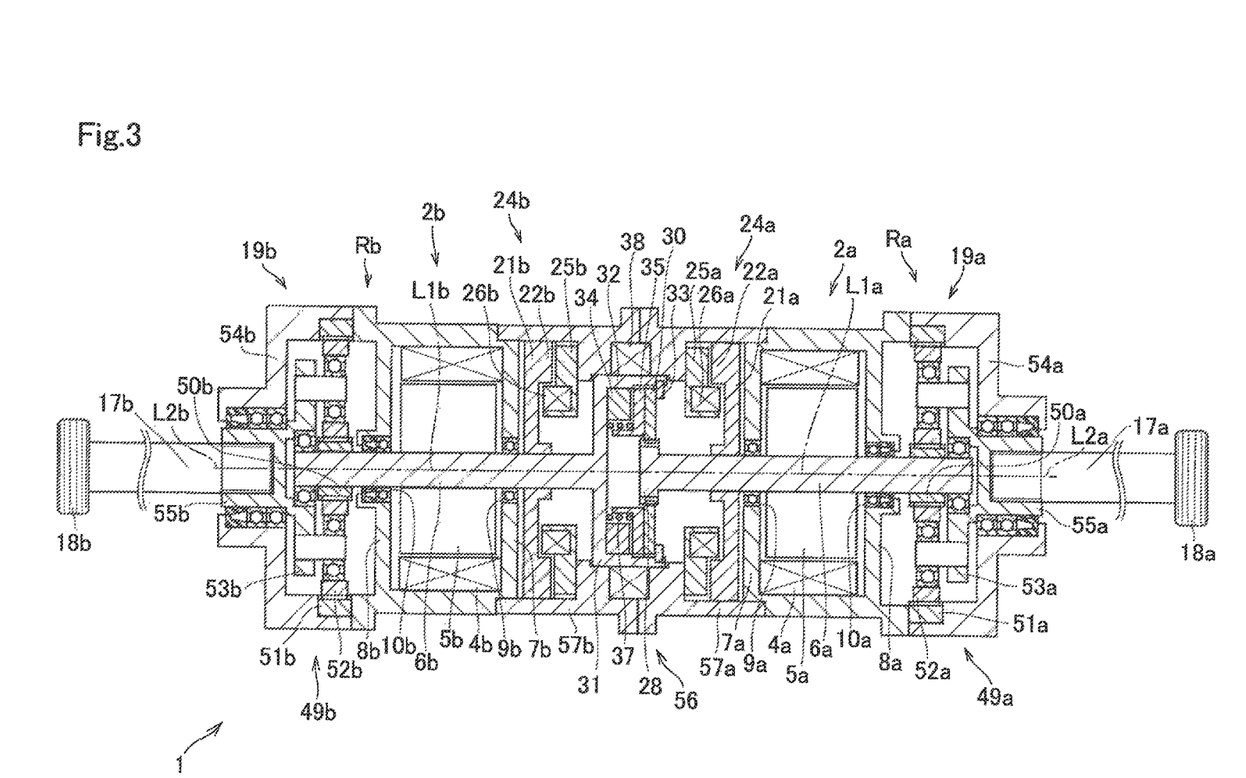
FIG. 3 is a cross-sectional view showing a structure of the drive unit according to a third embodiment of the present disclosure.

Turning to FIG. 3, there is shown the third embodiment of the drive unit 1 in which the output shafts 6a and 6b of the motors 2a and 2b and the driveshafts 17a and 17b are aligned coaxially. In the following explanation, common reference numerals are allotted to the elements in common with those in the foregoing embodiments, and detailed explanation for those common elements will be omitted. In the drive unit 1 shown in FIG. 3, a single pinion planetary gear unit 49 is connected to the laterally outer end of the output shaft 6 of the motor 2. Specifically, the planetary gear unit 49 comprises a sun gear 50, a ring gear 51 arranged concentrically with the sun gear 50, a plurality of pinion gears 52 interposed between the sun gear 50 and the ring gear 51, and a carrier 53 supporting the pinion gears 52 in such a manner as to allow the pinion gears 52 to revolve around the sun gear 50.

The planetary gear unit 49 is held in a bottomed-cylindrical cover member 54 in such a manner that the sun gear 50 is rotated integrally with the output shaft 6, and that the ring gear 51 is connected to an inner circumferential face of the cover member 54. The carrier 53 is connected to a cylindrical shaft 55, and the cylindrical shaft 55 protrudes laterally outwardly to penetrate through a bottom wall of the cover member 54 while being supported by the cover member 54 in a rotatable manner. In the planetary gear unit 49, the sun gear 50 is rotated at a higher speed than the carrier 53 so that the planetary gear unit 49 serves as the speed reducing device 19. The driveshaft 17 is inserted into the cylindrical shaft 55, and the cover member 54 is joined to the laterally outer end of the motor housing 3.

The laterally inner end of the motor housing 3 is joined to a center housing 56 formed by combining inner end portions of a first cylindrical member 57a and a second cylindrical member 57b.

The above-explained brake rotor 21 is fitted onto the laterally inner end portion of the output shaft 6. An outer circumferential face of the pushing member 25 is splined to an inner circumferential face of the center housing 56 in the width center side to be opposed to the brake rotor 21.

The connection shaft 28 is formed integrally on the laterally inner end of the first output shaft 6a, and the connection plate 30 is splined onto the connection shaft 28. On the other hand, the extension shaft 31 is formed on the laterally inner end of the second output shaft 6b, and the holder portion 32 is formed integrally with the extension shaft 31. The pushing plate 35, the cylindrical portion 36 and the coil spring 37 are held in the holder portion 32, and the coil 38 is wound around the holder portion 32. In the drive unit 1 shown in FIG. 3, the braking torque may be maintained during parking by halting any of the rotary members by a not shown pin or the like.

According to the third embodiment, a braking torque is applied to the output shaft 6 by bringing the pushing member 25 into contact to the brake rotor 21, and the braking torque is further applied to the driveshaft 17 and the drive wheel 18 through the planetary gear unit 49 while being amplified. According to the third embodiment, therefore, the brake rotor 21 and the pushing member 25 may be downsized. In addition, since the rotational center axes L1a and the L1b of the output shafts 6a and 6b are aligned coaxially with the rotational center axes L2a and the L2b of the driveshafts 17a and 17b, a height of the drive unit 1 may be shortened. Further, since the output shafts 6a and 6b are allowed to rotate integrally by the restriction device 27, running stability of the vehicle during propelling in a straight line or making a slight turn may be improved without requiring a complex control.

Although the above exemplary embodiment of the present application has been described, it will be understood by those skilled in the art that the drive unit according to the present application should not be limited to the described exemplary embodiment, and various changes and modifications can be made within the spirit and scope of the present disclosure. For example, the brake device 24 and the parking lock device 39 may also be actuated by a hydraulic actuator(s) to maintain the braking torque during parking. In addition, in the brake device 24, the pushing member 25 may also be brought into contact to the brake rotor 21 by a spring, and isolated away from the brake rotor 21 by a load established by an actuator. Further, the parking lock device 39 may also be configured to mechanically stop the rotation of any of the rotary members by engaging a parking gear with a parking lock arm.

What is claimed is:

1. A drive unit, comprising:
a prime mover including a first motor having a first output shaft, and a second motor having a second output shaft;
a first driveshaft that transmits torque from the prime mover to one of first and second drive wheels; and
a second drive shaft that transmits torque from the prime mover to other of the first and second drive wheels,
wherein the first drive shaft and the second drive shaft are allowed to be rotated by different torques,
the drive unit comprising:
a first gear train including gears rotating around axes parallel to a rotational center axis of the first output shaft that is formed between the first output shaft and the first driveshaft;
a second gear train including gears rotating around axes parallel to a rotational center axis of the second output shaft that is formed between the second output shaft and the second driveshaft;
a first rotary member that is arranged in the first gear train,
a second rotary member that is arranged in the second gear train; and
a restriction device that is interposed between the first rotary member and the second rotary member to restrict a differential rotation between the first drive wheel and the second drive wheel by changing a torque transmitted between the first rotary member and the second rotary member.

2. The drive unit as claimed in claim 1, further comprising:
a third rotary member arranged in the first gear train;
a fourth rotary member arranged in the second gear train; and
a lock device that stops rotation of any one of the third rotary member and the fourth rotary member.

3. The drive unit as claimed in claim 1,
wherein the restriction device includes a frictional engagement mechanism having a first rotary element rotated integrally with the first rotary member, a second rotary element rotated integrally with the second rotary member, and an actuator that selectively brings the second rotary element into contact to the first rotary element while controlling a contact pressure there between,
the first rotary element includes a first brake rotor,
the second rotary element includes a second brake rotor, and the drive unit further comprising:
a first brake device that brings a first fixing member into contact to the first brake rotor to apply a braking torque to the first rotary element; and
a second braking device that brings a second fixing member into contact to the second brake rotor to apply a braking torque to the second rotary element.

4. The drive unit as claimed in claim 1,
wherein a rotational center axis of the first motor and a rotational center axis of the second motor are aligned coaxially with each other,
the first output shaft extends toward the second motor,
a first output gear is fitted onto a portion of the first output shaft extending toward the second motor,
the first gear train connects the first output gear to the first driveshaft,
the second output shaft extends toward the first motor,
a second output gear is fitted onto a portion of the second output shaft extending toward the first motor,
the second gear train connects the second output gear to the second driveshaft, and
the restriction device is interposed between laterally inner ends of the first output shaft and the second output shaft to change a torque transmitted between the first output shaft and the second output shaft.

5. The drive unit as claimed in claim 1,
wherein a rotational center axis of the first motor and a rotational center axis of the second motor are aligned coaxially with each other,
the first driveshaft is connected to the first gear train in such a manner that the rotational center axis of an end portion thereof is aligned coaxially with the rotational center axis of the first motor, and
the second driveshaft is connected to the second gear train in such a manner that the rotational center axis of an end portion thereof is aligned coaxially with the rotational center axis of the second motor.

6. The drive unit as claimed in claim 5,
wherein the first output shaft protrudes from both sides of the first motor,
a first planetary gear unit comprising a first sun gear, a first carrier and a first ring gear is arranged on a portion of the first output shaft protruding from the first motor in a direction opposite to the second motor,
the first driveshaft is connected to the first carrier, the first output shaft is connected to the first sun gear, and the first ring gear is fixed,
the first gear train includes the first planetary gear unit,
the second output shaft protrudes from both sides of the second motor,
a second planetary gear unit comprising a second sun gear, a second carrier and a second ring gear is arranged on a portion of the second output shaft protruding from the second motor in a direction opposite to the first motor,
the second driveshaft is connected to the second carrier, the second output shaft is connected to the second sun gear and the second ring gear is fixed,
the second gear train includes the second planetary gear unit, and
the restriction device is interposed between the portion of the first output shaft protruding from the first motor in a direction opposite to the second motor and the portion of the second output shaft protruding from the second motor in a direction opposite to the first motor, to change a torque transmitted between the first output shaft and the second output shaft.

7. The drive unit as claimed in claim 2,
wherein the restriction device includes a frictional engagement mechanism having a first rotary element rotated integrally with the first rotary member, a second rotary element rotated integrally with the second rotary member, and an actuator that selectively brings the second rotary element into contact to the first rotary element while controlling a contact pressure therebetween,
the first rotary element includes a first brake rotor,
the second rotary element includes a second brake rotor, and
the drive unit further comprising:
  a first brake device that brings a first fixing member into contact to the first brake rotor to apply a braking torque to the first rotary element; and
  a second braking device that brings a second fixing member into contact to the second brake rotor to apply a braking torque to the second rotary element.

8. The drive unit as claimed in claim 2,
wherein a rotational center axis of the first motor and a rotational center axis of the second motor are aligned coaxially with each other,
the first output shaft extends toward the second motor,
a first output gear is fitted onto a portion of the first output shaft extending toward the second motor,
the first gear train connects the first output gear to the first driveshaft,
the second output shaft extends toward the first motor,
a second output gear is fitted onto a portion of the second output shaft extending toward the first motor,
the second gear train connects the second output gear to the second driveshaft, and
the restriction device is interposed between laterally inner ends of the first output shaft and the second output shaft to change a torque transmitted between the first output shaft and the second output shaft.

9. The drive unit as claimed in claim 3,
wherein a rotational center axis of the first motor and a rotational center axis of the second motor are aligned coaxially with each other,
the first output shaft extends toward the second motor,
a first output gear is fitted onto a portion of the first output shaft extending toward the second motor,
the first gear train connects the first output gear to the first driveshaft
the second output shaft extends toward the first motor,
a second output gear is fitted onto a portion of the second output shaft extending toward the first motor,
the second gear train connects the second output gear to the second driveshaft, and
the restriction device is interposed between laterally inner ends of the first output shaft and the second output shaft to change a torque transmitted between the first output shaft and the second output shaft.

10. The drive unit as claimed in claim 7,
wherein a rotational center axis of the first motor and a rotational center axis of the second motor are aligned coaxially with each other,
the first output shaft extends toward the second motor,
a first output gear is fitted onto a portion of the first output shaft extending toward the second motor,
the first gear train connects the first output gear to the first driveshaft,
the second output shaft extends toward the first motor,
a second output gear is fitted onto a portion of the second output shaft extending toward the first motor,
the second gear train connects the second output gear to the second driveshaft, and
the restriction device is interposed between laterally inner ends of the first output shaft and the second output shaft to change a torque transmitted between the first output shaft and the second output shaft.

* * * * *